(12) United States Patent
Lee et al.

(10) Patent No.: US 7,652,620 B2
(45) Date of Patent: Jan. 26, 2010

(54) RCS SIGNATURE GENERATION FOR CLOSELY SPACED MULTIPLE OBJECTS USING N-POINT MODELS

(75) Inventors: Chul J. Lee, Lexington, MA (US); Brian J. Harkins, Westford, MA (US)

(73) Assignee: Raytheon Company, Waltham, MA (US)

( * ) Notice: Subject to any disclaimer, the term of this patent is extended or adjusted under 35 U.S.C. 154(b) by 214 days.

(21) Appl. No.: 11/889,198

(22) Filed: Aug. 9, 2007

(65) Prior Publication Data

US 2009/0040098 A1  Feb. 12, 2009

(51) Int. Cl.
*G01S 13/00* (2006.01)
(52) U.S. Cl. .................. 342/195; 342/175; 342/169
(58) Field of Classification Search ............. 342/169, 342/175, 195
See application file for complete search history.

(56) References Cited

U.S. PATENT DOCUMENTS

| | | | |
|---|---|---|---|
| 4,123,165 | A | 10/1978 | Brown et al. |
| 4,373,808 | A | 2/1983 | Pell et al. |
| 5,086,396 | A | 2/1992 | Waruszewski, Jr. |
| 5,096,281 | A | 3/1992 | Windebank et al. |
| H1181 | H | 5/1993 | Rihaczek |
| 5,227,801 | A * | 7/1993 | Pierce .................. 342/192 |
| 5,305,430 | A * | 4/1994 | Glassner ............... 345/427 |
| 5,317,689 | A | 5/1994 | Nack et al. |
| 5,355,442 | A | 10/1994 | Paglieroni et al. |
| 5,392,050 | A * | 2/1995 | Guerci et al. ........... 342/90 |
| 5,583,975 | A | 12/1996 | Naka et al. |
| 5,588,032 | A | 12/1996 | Johnson et al. |
| 5,594,844 | A | 1/1997 | Sakai et al. |
| 5,616,031 | A | 4/1997 | Logg |
| 5,933,146 | A | 8/1999 | Wrigley |
| 5,953,722 | A | 9/1999 | Lampert et al. |
| 6,005,916 | A | 12/1999 | Johnson et al. |
| 6,031,542 | A | 2/2000 | Wittig |
| 6,212,132 | B1 | 4/2001 | Yamane et al. |
| 6,750,805 | B1 | 6/2004 | Cameron |
| 6,750,859 | B2 | 6/2004 | Sowizral et al. |
| 6,924,763 | B2 | 8/2005 | Poullin |
| 6,941,303 | B2 | 9/2005 | Perrizo |
| 7,123,548 | B1 | 10/2006 | Uzes |
| 7,289,118 | B2 | 10/2007 | Schmittler et al. |
| 7,348,975 | B2 | 3/2008 | Reshetov et al. |
| 7,535,408 | B2 | 5/2009 | Kuhn |

(Continued)

OTHER PUBLICATIONS

Notification of Transmittal of the International Search Report and the Written Opinion of the International Searching Authority, or the Declaration, PCT/US2008/072433 dated Feb. 24, 2009.

(Continued)

*Primary Examiner*—Thomas H Tarcza
*Assistant Examiner*—Timothy A Brainard
(74) *Attorney, Agent, or Firm*—Daly, Crowley, Mofford & Durkee, LLP

(57) ABSTRACT

A method and system for analyzing the RCS of an object using N Point signature prediction models is provided. N-point signature prediction models are created for each object in a scenario and stored in lookup tables. Shooting and Bounce trace back techniques are used to determine RCS signatures of multiple objects in modeled scenarios to account for blockage by and coupling phenomena of a scattered field.

15 Claims, 5 Drawing Sheets

U.S. PATENT DOCUMENTS

| | | | |
|---|---|---|---|
| 2002/0060784 A1 | 5/2002 | Pack et al. | |
| 2002/0075260 A1 | 6/2002 | Brokenshire et al. | |
| 2002/0087858 A1* | 7/2002 | Oliver et al. | 713/156 |
| 2003/0011519 A1 | 1/2003 | Breglia et al. | |
| 2003/0022395 A1 | 1/2003 | Olds | |
| 2005/0138073 A1* | 6/2005 | Zhou et al. | 707/104.1 |
| 2008/0132174 A1* | 6/2008 | Corral et al. | 455/67.16 |

OTHER PUBLICATIONS

Lozano L et al: "Improvements in Ray-Tracing Acceleration Techniques to Compute Diffraction Effect and Doubles and triples Effects in the RCS Prediction of Complex Targets", Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3, the whole document.

Schmitz J L et al: "Zpatch. A high frequency bistatic signature prediction code", Radar Conference, 1997, IEEE National Syracuse, NY, USA May 13-15, 1997, New York, NY, USA, IEEE, US, May 13, 1997, pp. 232-236, XP010224774, ISBN: 978-0-7803-3731-2, the whole document.

Yu C L et al: "Radar cross section computation and visualization by shooting-and-bouncing ray (SBR) technique", Proceedings of the antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8, the whole document.

Savides T et al: "Radar simulation using the shooting and bouncing ray technique" CCECE 2003. Canadian Conference on Electrical and Computer Engineering, Montreal, Canada, May 4-7, 2003; [Canadian Conference on Electrical and Computer Engineering], New York, NY, IEEE, US, vol. 1, May 4, 2003, pp. 307-310, XP010653888, ISBN: 978-0-7803-7781-3, the whole document.

Notification Transmittal of the International Search Report and the Written Opinion of the International Searching Authority, or the Declaration, PCT/US2008/072434 dated Feb. 6, 2009.

Walker et al., "Parallel Computation of Time-Domain Integral Equation Analyses of Electromagnetic Scattering and RCE", IEEE Transactions on Antennas and Propagation, IEEE Service Center, Piscataway, NJ, vol. 45., No. 4, Apr. 1, 1997, XP011002960, ISSN: 0018-926X, pp. 614-619.

Ngoly et al., "Parallel Post-Processing Techniques for Fast Radar Cross-Section Computation", 2006 12$^{th}$ Biennial IEEE Conf. on Electromagnetic Field Computation, Apr. 30, 2006, p. 377.

Jin-Lin Hu Et al, "RCS Computation of Jet Engine with Complex Termination Based on Multiplaten Z-buffer Algorithm", Microwave Conf., 1999 Asia Pacific Singapore, Nov. 30-Dec. 3, 1999, Picscataway, NJ, USA, IEEE, Nov. 30, 1999, XP010374299, ISBN: 978-0-7803-5761-7, pp. 781-784.

Ling, H.; Chou, R.-C.; Lee, S.-W.; Shooting and bouncing rays: calculating the RCS of an Arbitrarily Shaped Cavity, Feb. 1989; Antennas and Propagation, IEEE Transactions on vol. 37, Issue 2, pp. (2): 194-205.

3D scattering center extraction from Xpatch, Bhalla, R. Hao Ling, Dept. of Electr. & Comput. Eng., Texas Univ., Austin, TX; Antennas and Propagation Society International Symposium, 1995. AP-S. Digest, Jun. 18-23, 1995, vol. 4, on pp. 1906-1909 vol. 4, Jun. 18, 1995-Jun. 23, 1995.

Real-time radar cross section of complex targets by physical optics graphical processing; Rius, J.M.; Ferrando, M.; Antennas and Propagation Society International Symposium, 1990, AP-S. Merging Technologies for the 90's'. Digest. May 7-11, 1990 pp.: 1280-1283 vol. 3.

Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.

Ling, H.; Chou, R.C.; Lee, S.W.; "Shooting and Bouncing Rays: Calculating the RCS of an Arbitrarily Shaped Cavity", Feb. 1989; Antennas and Propagation, IEEE Transactions on vol. 37, Issue 2, pp. 194-205.

* cited by examiner

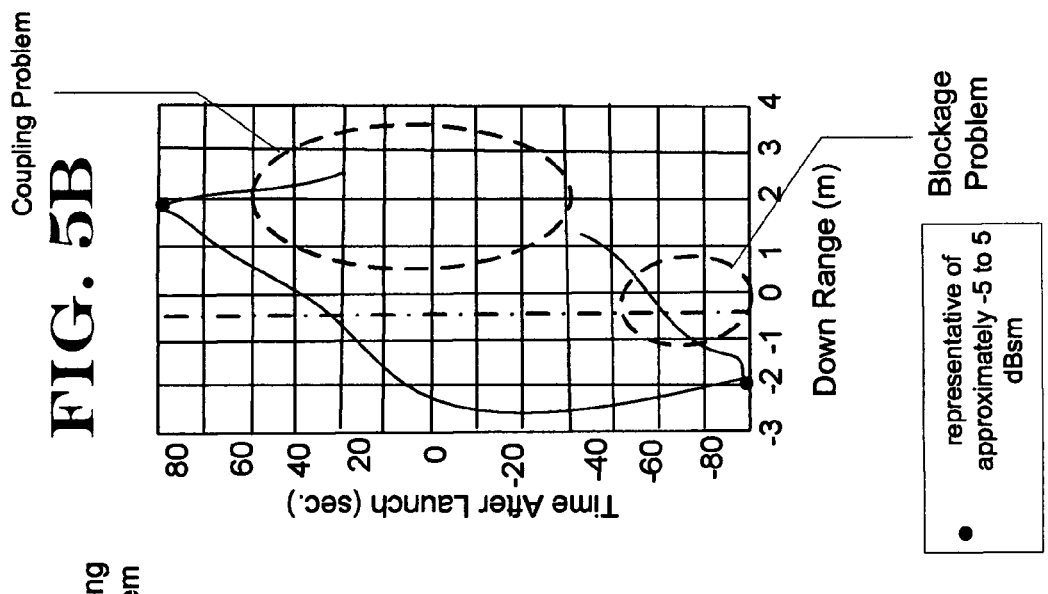
FIG. 5A
FIG. 5C
FIG. 5B
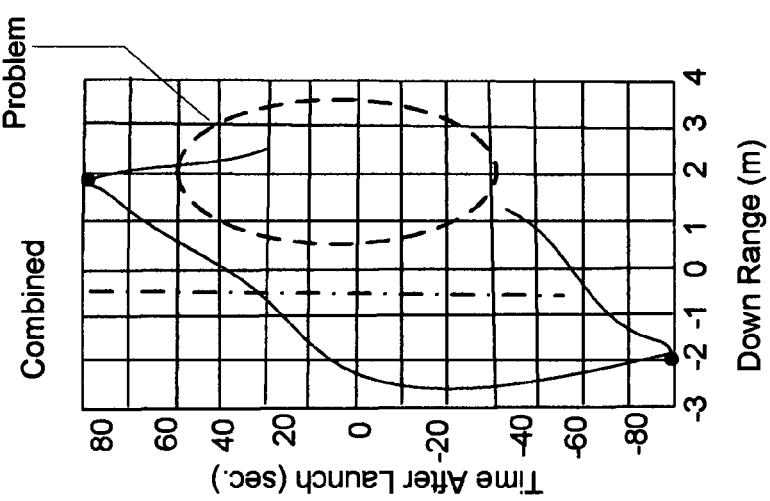
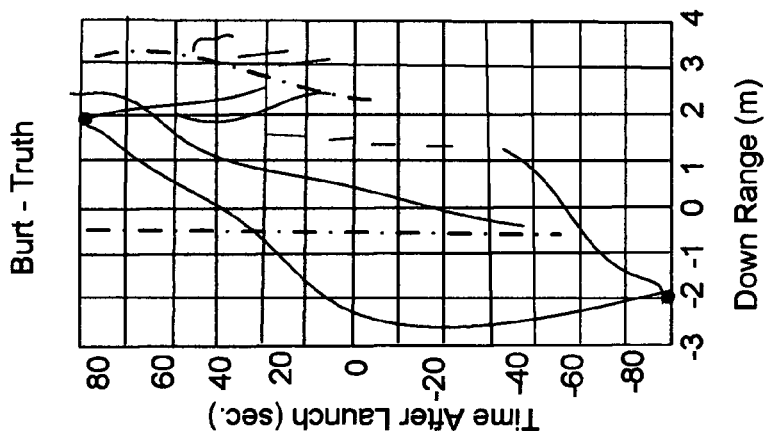

RCS SIGNATURE GENERATION FOR CLOSELY SPACED MULTIPLE OBJECTS USING N-POINT MODELS

BACKGROUND

Radar cross section (RCS) is a description of how an object (also known as a target) reflects an incident electromagnetic wave. Radar cross-section is dominated by size or cross section, since "size" governs how much energy from a radar illuminating source is reflected and sent back. The RCS is integral to the development of radar and applications involving small moving objects. For an arbitrary object, the RCS is highly dependent on the radar wavelength and incident direction of the radio wave. Knowing what the RCS signature of an object looks like is helpful in identifying objects in the sky with Radar. Multiple objects such as jets, flying in close formation may resemble a single larger plane if the radio frequency (RF) is not high enough and/or the wavelength utilized by the Radar is not compatible with the smaller radar cross sections of the objects being observed. Such a situation may present problems involving multiple objects being detected as a single object which can prove fatal in critical applications, e.g., in an air traffic control environment. Given all of the various flight vectors a plane might follow as well as the various formation planes might assume, this represents a great deal information in attempting to predict and identify all of the possible RCS signatures. In addition, multiple scattering phenomena and unwanted reflections can further confuse the probability of intercept (POI) (or proper detection). In order to remedy such problems, higher frequency microwave radars can be used, to allow higher definition radar cross sections (the closer to light frequencies the better the resolution—usually upwards of 100 GHz is better from this point of view, but RF technology is very costly to implement. In fact, the cost of higher frequency microwave radar technology can prove exponentially higher. An alternative to higher frequency microwave Radar (or used in conjunction with it) is the use of intelligent "back end" signal processing interpretation techniques. More specifically, a single massive database involving multiple object scenarios could be used to distinguish between the objects. This involves creating a large number of potential scenarios including analyzing relative views of the reflected waves. However, it is not practical to create a large number of potential scenarios including relative views from a Radar source to a potential targeted object since a variety of incident angles must be considered for determining an RCS signature. The alternative approach to such a massive database generation for creating multiple object scenarios is presented herein by the following methodology which can conceivably improve the probability of intercept of a Radar without resorting to the higher frequency/cost microwave technology, but could also be used in conjunction with it.

BRIEF DESCRIPTION OF THE DRAWINGS

FIG. 5A, illustrates a Range Time Intensity plot) according to an actual scene (Burt) including two objects (coin and rod).

FIG. 5B illustrates a Range Time Intensity plot for a modeled scene for two objects (coin and rod). Dotted line elliptical regions are shown around the coupling and blocking problems presented.

FIG. 5C illustrates a Range Time Intensity plot for a modeled scene for two objects (coin and rod) after a blockage check via the shooting back scheme. A dotted line elliptical region illustrates the coupling problem.

Figure 1:
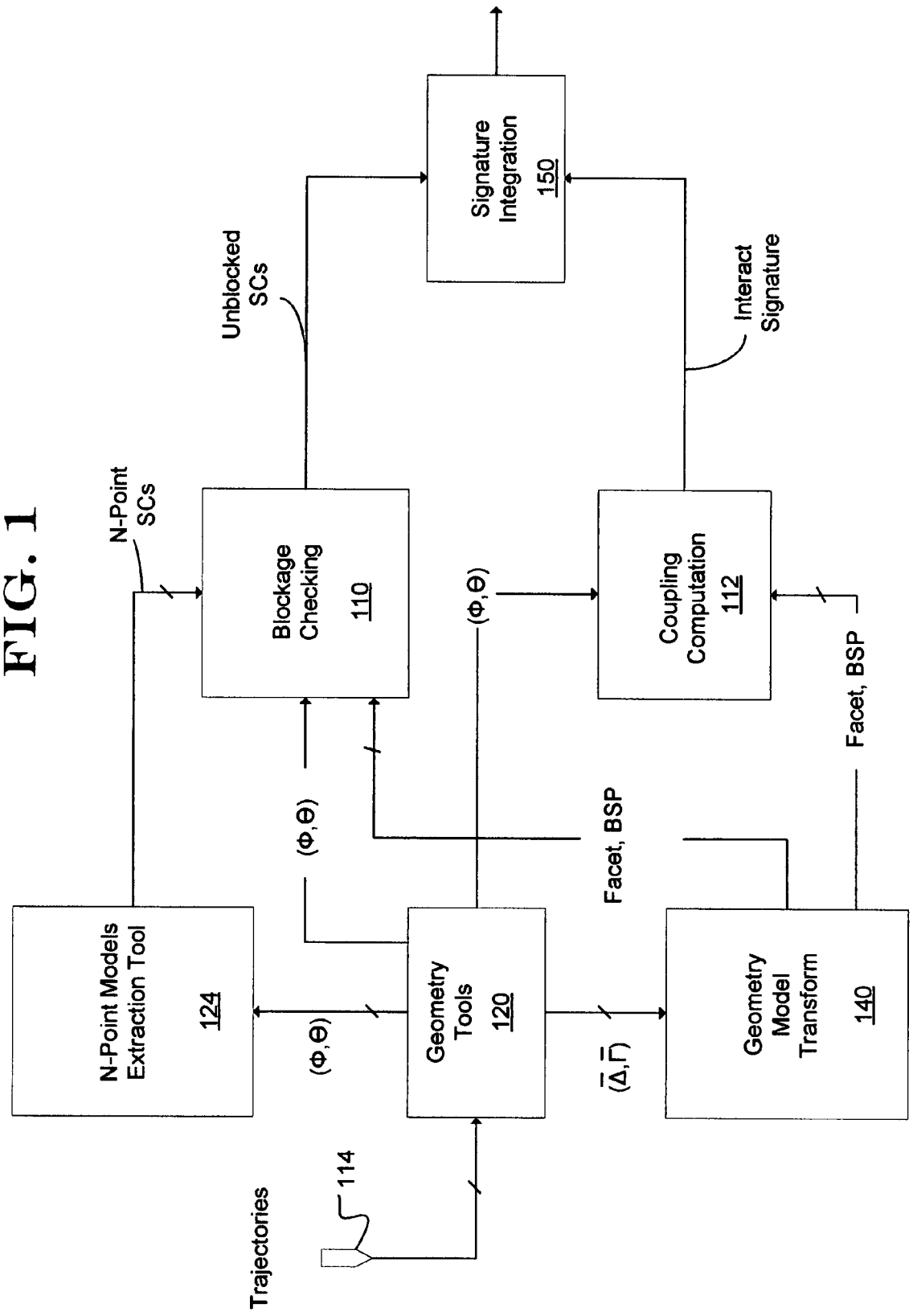
FIG. 1 illustrates a block diagram of one aspect of a preferred wherein a block diagram of the combining block is depicted.

Applicable reference numerals have been carried forward.

DETAILED DESCRIPTION

The following relates generally to a method and system for analyzing the Radar Cross Section (RCS) using N-point signature prediction models with radar. More specifically, a method and system are provided for accessing a database and computing multiple object RCS data, for closely spaced objects, from database information characterizing objects individually.

A Radar "back end" processing method of analyzing individual RCS data corresponding to each object scenario resulting from a plurality of objects, is provided using a computer system being programmed to compute the combined RCS signatures of the plurality of objects in a comprehensive scene created from the integration of individual RCS data, being further programmed to employ a ray tracing scheme to determine ray blockage and ray coupling as a result of object interaction, thus considerably improving target resolution and the probability of intercept (POI) of a Radar system.

Various aspects are directed to a method and system for analyzing the RCS of an object (also referred to as a target) using N-Point signature prediction models. N-Point signature prediction involves RCS modeling of an object according to commercially available methods, using N (an integer) points serving as scattering centers (SCs) for radar pulses directed at modeled objects. Each object is modeled as a collection of point scattering centers. Each model provides predictive representative of the RCS signature of an associated object. Thus, an N-point RCS signature prediction model is created for each object in a scenario and stored in a lookup table. Each scenario may take into account a variety of factors including the radar pulse angle of incidence on a scattering center. Features extracted by N-Point Models Extraction Tool 124, from scattering centers for the purpose of object classification/identification, may depend on the position and aspect angle of the object in the radar scene While obtaining a N-point RCS signature may be accomplished using a controlled environment with an actual or scale model of an object, preferably the RCS signature information is obtained using computer simulations. Therefore, preferably the RCS signature is obtained using a modeled radar illumination of a modeled object.

In one preferred embodiment, a RCS modeling block is used to create N-point models for each object using the Xpatch® simulation tool. The Xpatch® toolkit is a set of prediction codes and analysis tools that use the well-known shooting-and-bouncing ray (SBR) method to predict realistic far-field and near-field radar signatures for 3D target models. Xpatch® models objects using facet-based techniques to create models using facets having three or more edges, e.g., triangles. In one aspect, RCS signatures representing a combination of multiple objects are not stored in an RCS database containing RCS data for scenarios modeling multiple objects. Currently, storing RCS signature data resulting from the combined signatures of multiple objects covering a vast number of scenarios involving multiple signatures for the multiple N-point modeled objects is impractical. Further, the deterministic approach to ascertaining RCS signature data for multiple objects through the addition of RCS data for each object gives a different and less reliable result than the true RCS signature detected for a scenario involving multi-objects. Blockage and coupling phenomena account for the difference. Blockage results from a failure of a deterministic approach to account for one or more objects being interposed between scattering points on an N-point model and a radar pulse illumination source. Coupling refers to the object-to-object radar pulse interactions-something not present in single object scenarios providing signature predictions.

In one aspect, a Blockage Checking block and a Coupling Computation block are used to obtain RCS data for multiple objects by combining RCS data stored in a database having N-point object RCS signature data pertaining to individual objects. The Blockage checking block accounts for scattering prevented as a result of a shadowed illumination source that would arise due to one or more objects blocking the radar pulse illumination source. The Coupling computation block handles object-to-object interactions that arise from radar pulses scattering off of two or more objects.

FIG. 1 is a diagram illustrating one aspect of a methodology for RCS signature prediction involving multiple objects implementing both the aforementioned Blockage Checking block 110 and Coupling Computation block 112. However, these blocks may be implemented independently. In one preferred embodiment Trajectories 114 represent data associated with individual objects containing object orientation information. The object orientation may be a function of azimuth Φ and elevation θ relative to a coordinate system Trajectories 114 are input to Geometry Tool 120 which implements, according to well known methods, a geometry block defining the relative locations and orientations of the objects in a given scenario relative to a illuminating radar source (not shown).

With reference to FIG. 1, the parameters derived from Geometry Tool 120 support N-Point Models Extraction Tool 124 which extracts models from a N-point model database. As a result, all of the objects in the database are defined according to a common coordinate system as determined by Geometry Tool 120. Geometry Model Transform 140 defines the coordinate system relative to a spatial index structure which, in effect, subdivides a volume of a scene spatially into smaller volumes, each of which contain only a few simple geometric shapes, e.g. triangles, etc. These geometric shapes are commonly referred to as facets and the coordinate space can be recursively subdivided into convex sets by hyperplanes. A scene having various object orientations and members may be represented by a binary space partitioning tree. Scene data involving multiple objects may be further represented by kd trees which are a special case of the binary space portioning tree.

Figure 2:
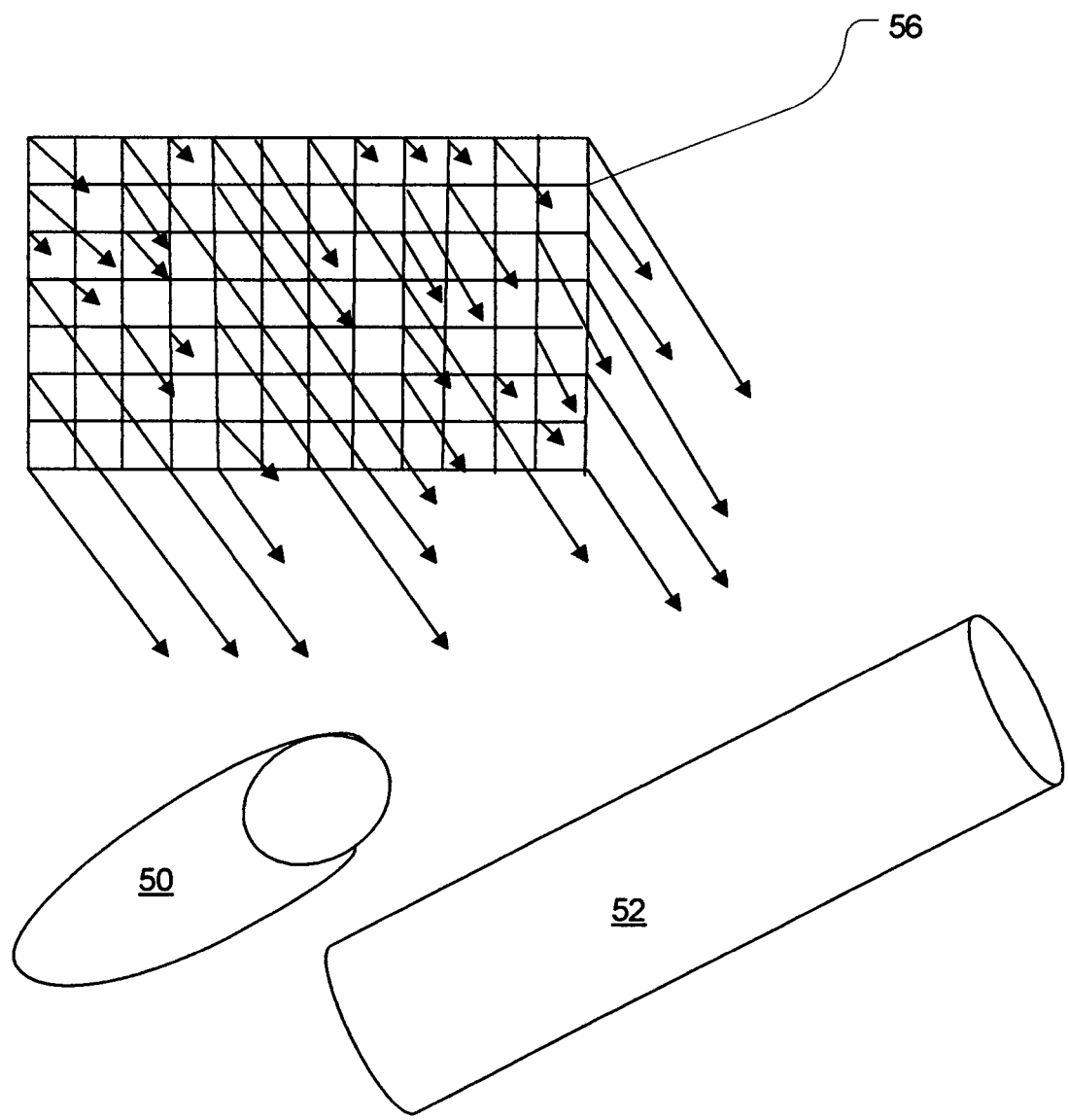
FIG. 2 illustrates combining diagram including, inter alia, a processing chain implementing a Blockage Coupling block.

In one embodiment a Blockage Coupling block 110 (FIG. 1) is implemented using the bounce and shooting ray technique. FIG. 2 illustrates combining diagram including, inter alia, a processing chain implementing a Blockage Coupling block. Multiple objects (two shown, cone 50 and cylinder 52) are placed within a common coordinate system. Next ray shooting grid 56 is generated as determined by geometry and viewing angles. Within a suitable simulation software such as Xpatch™, shooting rays, as they are commonly referred, are traced to the objects and traced until all bounces (reflections) are determined. Ray tracing is a commonly known technique employed in geometrical optics involving modeling the path of light by following rays of light as they interact with optical surfaces. Ray tracing, as used herein traces a path from the modeled radar illumination source which also accumulates the contribution of each radar return signal. As each ray is cast from a radar illuminating source, Blockage Checking block 110 of FIG. 1 tests whether an object blocks the ray returning, or shot back, from another object. With ray tracing, a the ray is either recast or terminated based on results (blocked) of the Blockage Checking block 110 (FIG. 1) or upon the ray tracing reaching a preset maximum recursion.

Geometry Transform Model 140 describes scenes mathematically for use in ray tracing. Following rays in reverse in a programmed simulation—that is, from a simulated radar receiving antenna radar accounts for radar return signals that provide significant information, excluding return signals that are absorbed by materials, bounce in a non-intersecting direction or do not otherwise reach the view frame cast from the simulated radar receiving antenna. It may be presupposed that a given ray intersects the view frame. In one embodiment, after either a maximum number of reflections or after the illuminating radar signal travels beyond a given distance without intersection, RCS data for the multi-object scene is updated.

When a ray hits a surface, it may reflect, diffract, become absorbed by the surface or it may shadow. A shadow ray is used to test if a surface is visible to a radar illuminating source. A ray hits a surface at some point. If the surface at this point faces the radar illuminating source, a ray is traced between this intersection point and the light. If any object is found in between that surface and the radar illuminating source, that surface is in shadow and the radar receiving antenna does not see that surface.

Figure 3:
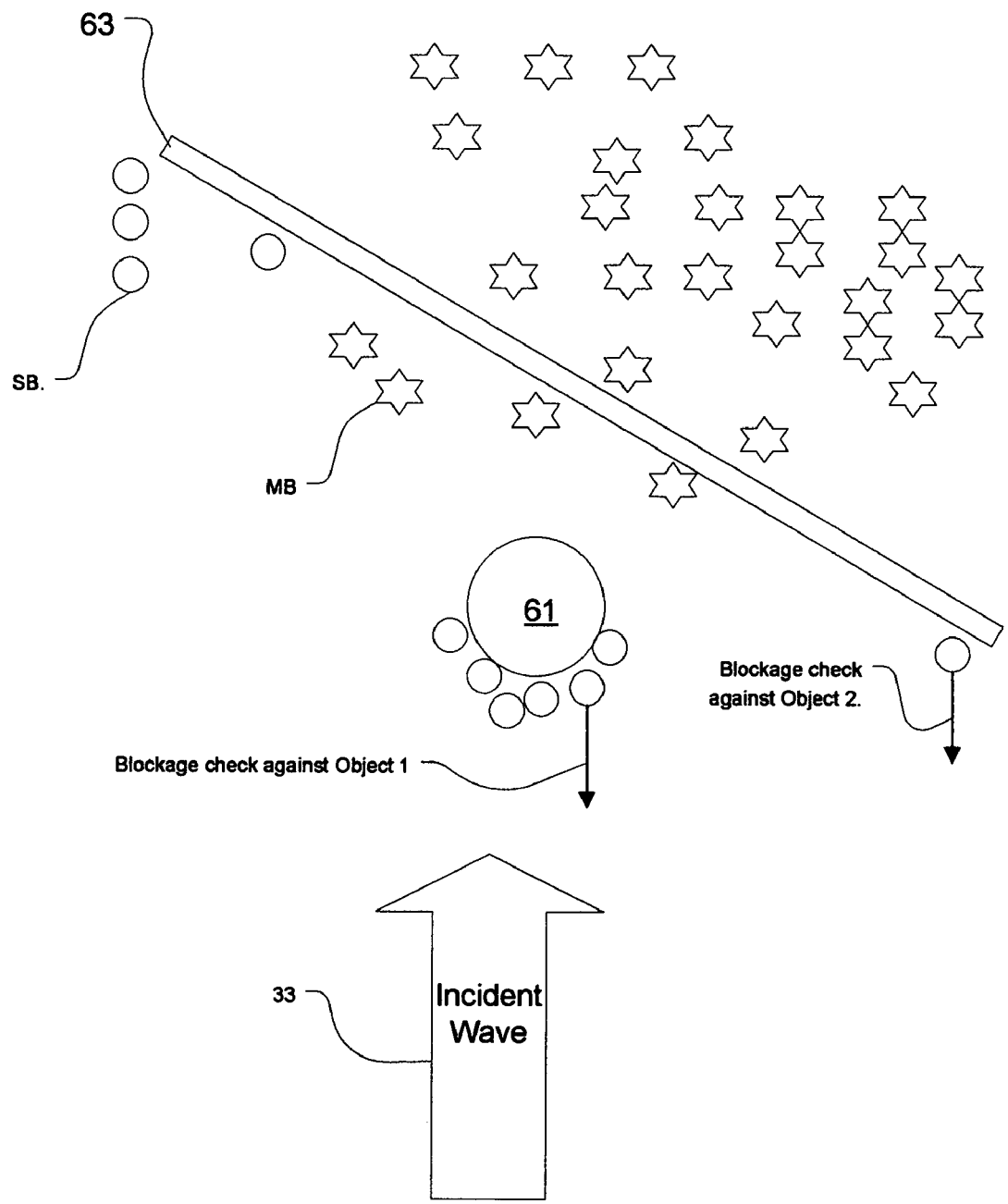
FIG. 3 is a diagram illustrating a RCS simulation scene involving two objects, coin 61 and rod 63.

FIG. 3 is a diagram illustrating a RCS simulation scene involving two objects, coin 61 and rod 63. Incident wave 33 from an illuminating radar source (not shown) is directed toward both objects, coin 61 and rod 63. Single bounce reflections are denoted with a small circle, (some of which are labeled SB). Multiple bounce reflections resulting from bounces between objects 61 and 63 are indicated by stars (some of which are labeled MB). In implementing a ray tracing scheme employing the Blockage Checking block of FIG. 1, single bounce scatterers SB shoot back a ray to the radar illumination source and a check is made for obstruction (blockage) using the Blockage Checking block of the shoot back ray 9 (e.g. a line segment in the computer simulation) caused by other objects in the scene. Blockage Checking block 110 does not use data from multiple bounce MB scatterers since multiple bounce scatters for the objects in a scene are accounted for by Coupling Computation block 112 (FIG. 1). If the ray return is not obstructed, the ray trace as carried out in a computer tests the ray for survivability. Consequently, some rays are expected not to survive based on simulation data indicative of the shape or material of the model object. For instance, where an illuminating radar source pulse ray is expected to be substantially absorbed and not reflected or diffracted by a material on an object, that ray is considered as not surviving.

In another embodiment, a ray tracing (i.e., Shoot back) block analyzes the RCS based on the ray pattern generated by an incident ray from a given angle Ω.

Figure 4:
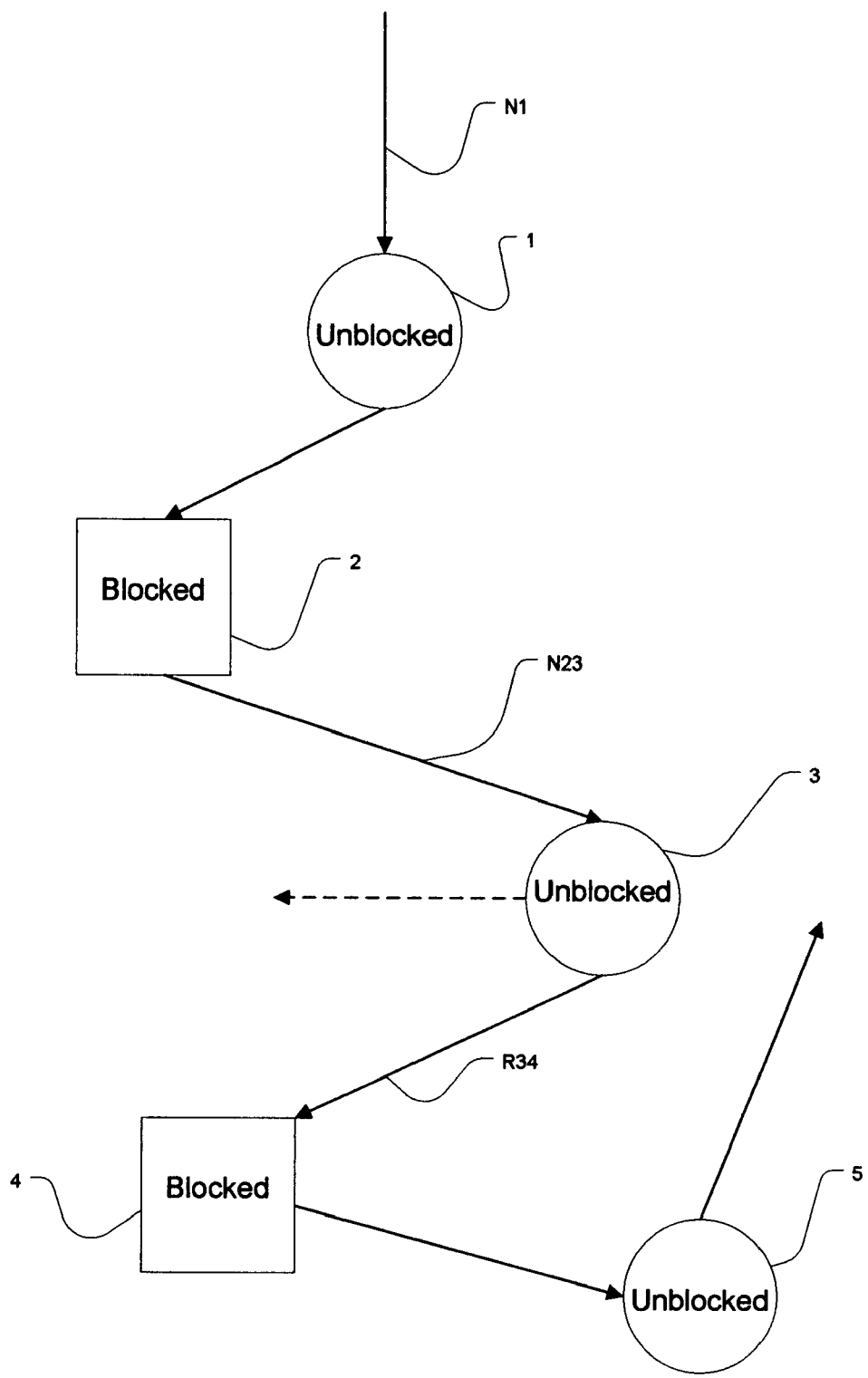
FIG. 4 illustrates an example of a multiple bounce ray traces with 5 bounce points.

FIG. 4 illustrates an example of a multiple bounce ray traces with 5 bounce points labeled 1 through 5 respectively. At each reflection point the block as implemented in Xpatch™, estimates the location of the "hit" point, the incident direction of the ray, the reflected direction of the ray and the vector of the local normal, surface material property, etc. Further, a blockage check by shooting back is performed to determine whether a ray bounce "shadowed." Shadowed bounces will not contribute to multi-bounce object responses.

Blockage Checking block 110, as shown in FIG. 1, determines whether the bounce of the incident ray's reflection is shadowed or not. The multiple bounce contributions by the multiple bounce scatterers are determined by coupling Computation block 112 (FIG. 1) by computing the surface current and scattered electric field at each bouncing location.

With reference to FIGS. 5A, 5B and 5C which illustrate a Range Time Intensity plot (FIG. 5A) according to an actual scene (Burt) including two objects (coin and rod) and Range Time Intensity plots (FIGS. 5B and 5C) for a modeled scene for two objects (coin and rod), an illumination source aspect angle (in degrees) is shown on the ordinate while down range in meters is shown on the abscissa. Burt is a well known modeling program for use with display of actual radar information. Burt represents the desired RCS signature plot of the two combined objects in a scene. FIG. 5B illustrates the blockage and coupling problem noted by the absence of artifact information in the circled regions denoted Coupling Problem and Blockage Problem respectively. The Blockage problem is solved by the shoot back scheme described herein where the blockage problem is eliminated. The elimination of the blockage problem is manifested by the elimination of RCS data the full range of the plot in FIG. 5C, similar to that shown in FIG. 5A. This corresponds to the coin 61 (FIG. 3) shadowing part of the rod 63 (FIG. 3) from a radar illuminating source. The RTI plots assume the coin is of a 0.5 m radius and that the rod is position down range at 2 meters. Prior to performing the Coupling computation in block 112 of FIG. 1, the coupling problem resulting from demonstrating only individual RCS data for each object (coin 61 and rod 63 of FIG. 3) is characterized in FIG. 5C by the absence of artifacts in the circled area which fail to account for object-to object interactions. The multiple bounce and the single bounce computations are integrated and a magnitude and phase of the total scatter contribution is determined by a suitably programmed computer using Signature Integration block 150 (FIG. 1). An electric plane wave incident on an object excites electric surface currents on that object. A scattered field is the result of the surface current and fields that arise when incident radiation strikes an object. The Physical optics (PO), for the high frequency RCS prediction, is an approximated technique to solve Maxwell's equations to determine the surface currents which in turn may be used to obtain the scattered electric field and thus the RCS signature for the combination of the multiple objects in a scene.

The foregoing allows individual objects to be combined and for RCS computation interactions among objects to be computed using the foregoing described recursive ray technique employing shoot back. With reference again to FIG. 2, each ray is traced until all reflection opportunities or bounces are determined. The shadowed bounces will not contribute to multi-bounce object responses. Multi-Bounce Contribution block 206 computes the surface current and scattered electric field at each bouncing location and integrates them to compute magnitude and phase.

The Combining block presented herein identifies the method and a system by which scenario realism is added, particularly in object dense scenarios, using N-point signature models. More specifically, in the various embodiments the methods employed may use a combination of techniques; including, the use of N-point models in an RCS database for single bounce Physical Optics (PO) and Diffraction (DF) predictions; shadow checking employing a shooting back scheme; fast and minimum storage ray-triangle intersection; and high quality Binary Space Partitioning (BSP) constructing axis aligned BSP trees, (i.e. kd-tree; fast kd-tree transversal).

Ray tracing is also contemplated for use herein together with ray zone density testing and stencil buffering to facilitate better object geometry models by increasing the level of detail in each facet model and by increasing time and ray accumulations in the time domain.

Although the invention herein has been described with reference to particular embodiments, it is to be understood that these embodiments are merely illustrative of the principles and applications of the present invention. For instance, although the mobile devices referenced herein having been described in connection to access associated with a mobile device, it is also intended that feature access may depend on the identity of a user of a mobile device. Therefore, in connection with the identity of the user, access to features and/or services may vary. It is therefore to be understood that numerous modifications may be made to the illustrative embodiments and that other arrangements may be devised without departing from the spirit and scope of the present invention as defined by the appended claims.

The invention claimed is:

1. A computer comprising:
a database including individual RCS data corresponding to each object from a plurality of objects, the computer system being programmed to determine the combined RCS signatures of the plurality of objects in a scene from the integration of individual RCS data, the computer system being further programmed to employ a ray tracing scheme to determine ray blockage and ray coupling as a result of object interaction from radar pulses scattering off of two or more objects.

2. A computer as recited in claim 1 wherein said database is organized using Binary Space partitioning (BSP).

3. A computer as recited in claim 1 wherein said database is accessible using a KD-tree transversal.

4. A computer as recited in claim 1 wherein said database is accessible using a fast KD transversal.

5. A computer as recited in claim 1 wherein said RCS data comprises a plurality of N-point models, N being an integer.

6. A method, comprising:
determining a combined RCS signature for multiple objects in a scene comprising:
deterministically integrating RCS data corresponding to the multiple objects;
performing ray tracing simulations to determine obstructed views from a radar illuminating source to one or more objects; and
performing ray tracing simulations to determine ray bounce interactions among the multiple objects from radar pulses scattering off of two or more objects.

7. A method as recited in claim 6 wherein said ray bounce interactions include single bounce interactions and multi-bounce interactions.

8. A computer programmable medium, comprising:
computer-executable instructions for performing a method comprising:
receiving individual RCS data corresponding to a plurality of vehicles;
determining a path, traced along one or more modeled rays, of a return radar signal from one or more vehicles to a point of origin of a radar signal incident upon one or more of said vehicles;
determining whether the computed path would be obscured from one or more vehicles by one or more other vehicles from said the plurality of vehicles;
determining magnitude and phase data from a scattered field as presented by the return radar signal; and performing ray tracing simulations to determine ray bounce interactions among the multiple objects from radar pulses scattering off of two or more of the multiple objects.

9. A computer programmable medium as recited in claim 8 wherein determining whether the computed path would be obscured includes performing ray tracing simulations to determine obstructed views from a radar illuminating source to one or more objects.

10. A computer programmable medium as recited in claim 8 wherein said ray bounce interactions include single bounce interactions and multi-bounce interactions.

11. A computer programmable medium as recited in claim 8 wherein said medium includes storage capability for said individual RCS data.

12. A computer programmable medium as recited in claim 11 wherein individual RCS data is organized using Binary Space partitioning (BSP).

13. A computer programmable medium as recited in claim 11 wherein RCS data is accessible using a KD-tree transversal.

14. A computer programmable medium as recited in claim 11 wherein RCS data is accessible using a fast KD transversal.

15. A computer programmable medium as recited in claim 11 wherein said RCS data comprises a plurality of N-point models, N being an integer.

* * * * *

UNITED STATES PATENT AND TRADEMARK OFFICE
CERTIFICATE OF CORRECTION

| | |
|---|---|
| PATENT NO. | : 7,652,620 B2 |
| APPLICATION NO. | : 11/889198 |
| DATED | : January 26, 2010 |
| INVENTOR(S) | : Lee et al. |

It is certified that error appears in the above-identified patent and that said Letters Patent is hereby corrected as shown below:

Col. 1, line 27, delete "deal information" and replace with -- deal of information --.

Col. 1, line 34, delete "-" and replace with -- , --.

Col. 1, line 58-59, delete "preferred wherein" and replace with -- preferred embodiment wherein --.

Col. 2, line 1, delete "FIG. 5A," and replace with -- FIG. 5A --.

Col. 2, line 1, delete "plot)" and replace with -- plot --.

Col. 2, line 39, delete "provides predictive" and replace with -- provides a predictive --.

Col. 2, line 48, delete "scene While" and replace with -- scene. While --.

Col. 2, line 61, delete "models objects" and replace with -- model objects --.

Col. 3, line 32, delete "system" and replace with -- system. --.

Col. 3, line 52, delete "kd" and replace with -- KD --.

Col. 4, line 46, delete "scatters" and replace with -- scatterers --.

Col. 5, line 23, delete "data the" and replace with -- data and the --.

Col. 5, line 66, delete "kd-tree; fast kd-tree" and replace with -- KD-tree; fast KD-tree --.

Signed and Sealed this
Twenty-eighth Day of December, 2010

David J. Kappos
*Director of the United States Patent and Trademark Office*